United States Patent
Schick

(10) Patent No.: US 6,607,669 B2
(45) Date of Patent: *Aug. 19, 2003

(54) METHOD AND APPARATUS FOR ENHANCING FILTRATION YIELDS IN TANGENTIAL FLOW FILTRATION

(75) Inventor: Karl G. Schick, Madison, WI (US)

(73) Assignee: SciLog, Inc., Middleton, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/977,454

(22) Filed: Oct. 15, 2001

(65) Prior Publication Data

US 2002/0043487 A1 Apr. 18, 2002

Related U.S. Application Data

(63) Continuation-in-part of application No. 09/603,148, filed on Jun. 23, 2000, now Pat. No. 6,350,382.

(51) Int. Cl.[7] .............................................. B01D 61/12
(52) U.S. Cl. ........................ 210/637; 210/86; 210/87; 210/90; 210/103; 210/134; 210/137; 210/321.65; 210/650
(58) Field of Search ............................ 210/86, 87, 90, 210/96.1, 96.2, 97, 103, 110, 134, 137, 195.2, 198.1, 257.2, 258, 321.65, 416.1, 637, 639, 650, 651, 739, 741, 805, 634

(56) References Cited

U.S. PATENT DOCUMENTS

| | | | |
|---|---|---|---|
| 4,626,346 A | * 12/1986 | Hall ............................ 210/137 |
| 4,680,109 A | * 7/1987 | Yamada et al. ............. 210/103 |
| 4,818,384 A | 4/1989 | Mayer |
| 5,076,913 A | * 12/1991 | Miller et al. ................ 210/134 |
| 5,076,931 A | 12/1991 | Muller |
| 5,112,489 A | 5/1992 | Hartmann |
| 5,200,090 A | 4/1993 | Ford et al. |
| 5,256,294 A | 10/1993 | van Reis |
| 5,282,972 A | * 2/1994 | Hanna et al. ............. 210/195.2 |
| 5,328,584 A | 7/1994 | Erickson et al. |
| 5,340,290 A | 8/1994 | Clemens |
| 5,431,811 A | 7/1995 | Tusini et al. |
| 5,520,816 A | 5/1996 | Kuepper |
| 5,589,076 A | * 12/1996 | Womack ..................... 210/739 |
| 5,597,486 A | 1/1997 | Lutz |
| 5,693,229 A | 12/1997 | Hartmann |
| 5,776,345 A | 7/1998 | Truitt et al. |
| 5,791,880 A | 8/1998 | Wilson |
| 5,947,689 A | 9/1999 | Schick |
| 5,958,244 A | * 9/1999 | Hartmann ................... 210/650 |
| 6,350,382 B1 | * 2/2002 | Schick ....................... 210/637 |
| 6,375,847 B1 | 4/2002 | Hartmann |

FOREIGN PATENT DOCUMENTS

| | | |
|---|---|---|
| FR | 2 785 830 A1 | 5/2000 |
| JP | 07068257 | 3/1995 |
| JP | 10076143 | 3/1998 |
| WO | WO 99 02245 | 1/1999 |

OTHER PUBLICATIONS

Technical Bulletin: *MidGee™ Cross Flow Filters*, A/G Technology Corporation, 1996.

(List continued on next page.)

*Primary Examiner*—Joseph Drodge
(74) *Attorney, Agent, or Firm*—Cook, Alex, McFarron, Manzo, Cummings & Mehler, Ltd.

(57) ABSTRACT

A system is provided for proceeding with filtration of liquids in a manner having enhanced control characteristics. Yields are enhanced. The system and method can be used to maintain a substantially constant trans-membrane pressure. When desired, that constant trans-membrane pressure is especially well-suited to yield enhancement for the particular liquid being filtered, concentrated or collected, while minimizing a risk of damage to or loss of valuable components. Additionally, a constant feed rate or pump output can be maintained.

35 Claims, 6 Drawing Sheets

OTHER PUBLICATIONS

Operating Instructions: *MiniKros Sampler System*, Microgon Inc., 1995.

Technical Bulletin: *The MiniKros® Sampler System*, Spectrum Microgon, 5/96.

Technical Bulletin: *Microgon Techniques for Processing Uniform Latex Particles*, Microgon Inc., 1992.

William F. Blatt, Lita Nelsen, Eliseo M. Zipiliyan, and Mark C. Porter, *Rapid Salt Exchange by Coupled Ultratiltration and Dialysis in Anisotropic Hollow Fibers*, Separation Science, 7(3) pp. 271–284, 1972.

W.F. Blatt, S.M. Robinson, and Harris J. Bixler, *Membrane Ultrafiltration: The Diafiltration Technique and it Microsolute Exchange and Binding Phenomena*. Analytical Biochemistry, 26, pp. 151–173, 1968.

Willima F. Bowers and Rudy H. Haschmeyer, *A Versatile Small–Volume Ultrafiltration Cell. Analytical Biochemistry*, 25, pp. 549–556, 1968.

UltraTec™ Filtration System, *Operations Manual Version: 1.28,*. SciLog, Inc., Apr., 1997.

D. Si–Hassen et al.; Optimisation of an intermitten cross–flow filtration process of mineral suspensions; Journal of Membrane Science, Amsterdam, NL,vol. 118, No. 2; Sep. 11, 1996.

Carrere H.; Study of hydrodynamic parameters in the cross–flow filtration of guar gum pseudoplastic solutions; Journal of Membrane Science, Amsterdam, NL, vol. 174, No. 1; 07–00.

\* cited by examiner

METHOD AND APPARATUS FOR ENHANCING FILTRATION YIELDS IN TANGENTIAL FLOW FILTRATION

CROSS-REFERENCE TO RELATED APPLICATION

This is a continuation-in-part of application Ser. No. 09/603,148, filed Jun. 23, 2000, now U.S. Pat. No. 6,350,382.

BACKGROUND AND DESCRIPTION OF THE INVENTION

The invention generally relates to the filtration of liquids, more particularly to high precision separation suitable for use in the pharmaceutical and biotechnology industries. The invention is especially applicable to filtration through a porous membrane sheet or a porous hollow fiber column. With the invention, a variety of separation techniques are handled in a yield-enhancing manner and can be automated, including having the separation proceed until a desired level of concentration or other characteristic or parameter is attained. The invention enhances separation processes such as microfiltration, microparticle coating and washing, ultrafiltration, diafiltration and certain preparative chromatography applications. It also improves yield in automated viral infection of mammalian cells such as in gene therapy research and development, as well as rapid cell separation, protein clarification and protein concentration.

In the pharmaceutical and biotechnology industries, the use of micro-filtration, ultrafiltration, tangential or cross-flow filtration, as well as constant volume diafiltration are well-established methods for the separation of dissolved molecules and/or suspended particulates. Typically, the liquid to be filtered is forced through a porous membrane sheet or a porous hollow fiber column. Such sheets or membranes are commercially available in different pore sizes. Depending upon the selected pore size, molecules or particulates smaller than the average membrane or column pore size will pass, together with solvent for example, through the membrane or hollow fiber walls. These molecules or particulates are collected as filtrate, while the retentate is left behind. In many filtration approaches, such as those incorporating ultrafiltration or other tangential-flow filtration devices, the retentate is repeatedly re-circulated with the objective of improving filtration efficiency and enhancing the yield of the filtrate or permeate.

However, filtration devices tend to clog when used over an extended period of time and must be timely replaced. Clogging of a filtration device occurs when the membrane pores become obstructed, typically with trapped cells, particulate matter, cell debris or the like. This clogging of the pores results in a decreased liquid flow across the porous membrane sheet or hollow fiber column wall. The result is a change in the TMP (trans-membrane pressure) which, if not properly addressed, runs the risk of serious detriment to the operation which incorporates the filtration procedure.

Attempts to address these concerns and difficulties have included the development and use of semi-automated filtration systems. These types of systems utilized either manually controlled recirculation pumps or pumps which are controlled by a timing device which will stop pump action after a preset filtration time has elapsed. It is also typical to monitor line pressure through the use of an analog or a digital pressure gauge, usually located between the pump and the filter device. When the gauge reads a certain line pressure level, typically one specified by the manufacturer of the filter device, the filtration must be stopped and the old filter must be replaced with a new one. At times, it is not possible to accurately predict the time at which the pumping action must be stopped in order to avoid overtaxing the filter device. Accordingly, prior art systems which rely solely on timing are not entirely satisfactory.

Prior art filtration technology such as that referred to above also is disadvantageous because it is typically very labor intensive. This prior technology also has additional, serious shortcomings for safe and efficient operation. One shortcoming is that the filtrate yield is frequently not quantitative because of unpredictable solution particulate loads. Thus, for a given re-circulation volume and pump rate, the filtrate yield may differ from case to case, depending upon the amount of pore-sized particulate suspended in the recirculation solution. Another shortcoming is a direct result of back pressure build up due to clogging and gel layer formation. Rapid back pressure build up at times causes bursting of the filter membrane and/or the filter housing, resulting in costly spillage and/or filtrate contamination. Excessive filter inlet pressure also frequently leads to blow-off of tube connections such as at the filter inlet, resulting in costly spillage of retentate, for example. Because of these types of shortcomings, manual and semi-automated filtration systems need to be constantly monitored, which greatly contributes to the high labor intensity of such approaches.

Filtration arrangements as described in Schick U.S. Pat. No. 5,947,689, incorporated hereinto by reference, provide for quantitative capability with TMP pressure monitoring. Such a filtration approach allows for rapid and safe filtration without concern of losing product, particularly pharmaceutical products or biotechnology products which can be extremely expensive, difficult to replace, and can represent the investment of many hours of prior processing. This patent describes coaxing the maximum life out of a filtration device without running the risk of generating operational conditions which can lead to excessive back pressure build up near the end of the life of the filtration device.

It has been found that, by proceeding in accordance with the present invention, it is possible to achieve quantitative filtration of liquids in an automated, safe, labor unintensive manner, all while enhancing the yield of the operation while determining and maintaining parameter values of the filtration system such as trans-membrane pressure, pump output and beneficial filtration conditions.

SUMMARY OF THE INVENTION

The system of the present includes a reservoir which contains the liquid to be filtered, typically including valuable pharmaceutical or biotechnological material which needs to be concentrated or separated from a liquid component, such as a media, a carrier, a reaction solution, or other liquid component and which are in need of separation in accordance with precise filtration techniques. A conduit system directs this liquid into a filtration unit through the action of a processor-controlled pump unit.

In a preferred embodiment, at least one pressure sensor is positioned along the conduit system. The processor-controlled pump unit is capable of maintaining constant trans-membrane pressure and/or pump output, determining optimal filtration conditions, and/or monitoring pressures using a peak pressure mode for determining accurate trans-membrane pressures.

Furthermore, in another preferred embodiment, at least one concentration monitor is positioned along the conduit system capable of monitoring permeate or retentate concentrations. The processor-controlled pump unit accepts the output of such concentration monitors and provides an alarm signal when user-defined concentration limits are exceeded. Alternatively, the process-controlled pump unit will respond to the changing output of such concentration monitors by activating conduit valves, thereby allowing reagents to be added to the system or retentate/permeate to be diverted.

It is a general object of the present invention to provide an improved automated, quantitative liquid filtration apparatus and method suitable for precisely handling filtration of pharmaceutical and/or biotechnology materials.

Another object of the present invention is to provide an improved apparatus and method for exacting filtration of liquids through a constant pressure mode which enhances yield of collected components.

Another object of this invention is to provide an improved apparatus and method for the filtration of liquids which vary filter inlet pressure in accordance with a varying level of resistance to flow (increase in fluid viscosity) which develops within the system, particularly the filtration unit.

Another object of the present invention is to provide an improved liquid filtration system and method which are automated and need not be constantly monitored by an operator, thereby being characterized as having very low labor intensity.

Another object of the present invention is to provide improved filtration which includes the use of logic data flow which adjusts pump output in response to changing viscosity of the liquid being filtered.

Another object of the present invention is to provide an improved concentration system or method for adjusting filter retentate output flow in order to maintain optimal product flow in response to changing product characteristics, e.g. increase in fluid viscosity due to removal of solvent.

Another object of the present invention is to provide an improved liquid filtration system which includes the use of flow-through (concentration) detectors, including pH, conductivity, trubidity, UV, and fluorescence detectors for monitoring and controlling the progress and safety of tangential flow filtration procedures.

Another object of the present invention is to provide an improved liquid filtration system which includes the use of flow-through detector outputs to control filtration system configuration in response to changes in permeate or retentate concentration in order to enhance filtration yield and safety.

Another object of the present invention is to provide an improved liquid filtration system which includes the use of serial communication protocols and hardware for remote control and programming (uploading and downloading of filtration programs) of the processor-controlled pump unit as well as reporting of filtration data parameters to remote supervisory sites, which capability is important when the processor-controlled pump unit is located in an access-limited clean room.

These and other objects, features and advantages of the present invention will be clearly understood through a consideration of the following detailed description.

BRIEF DESCRIPTION OF THE DRAWINGS

In the course of this description, reference will be made to the attached drawings, wherein.

DESCRIPTION OF THE PARTICULAR EMBODIMENTS

Figure 1:
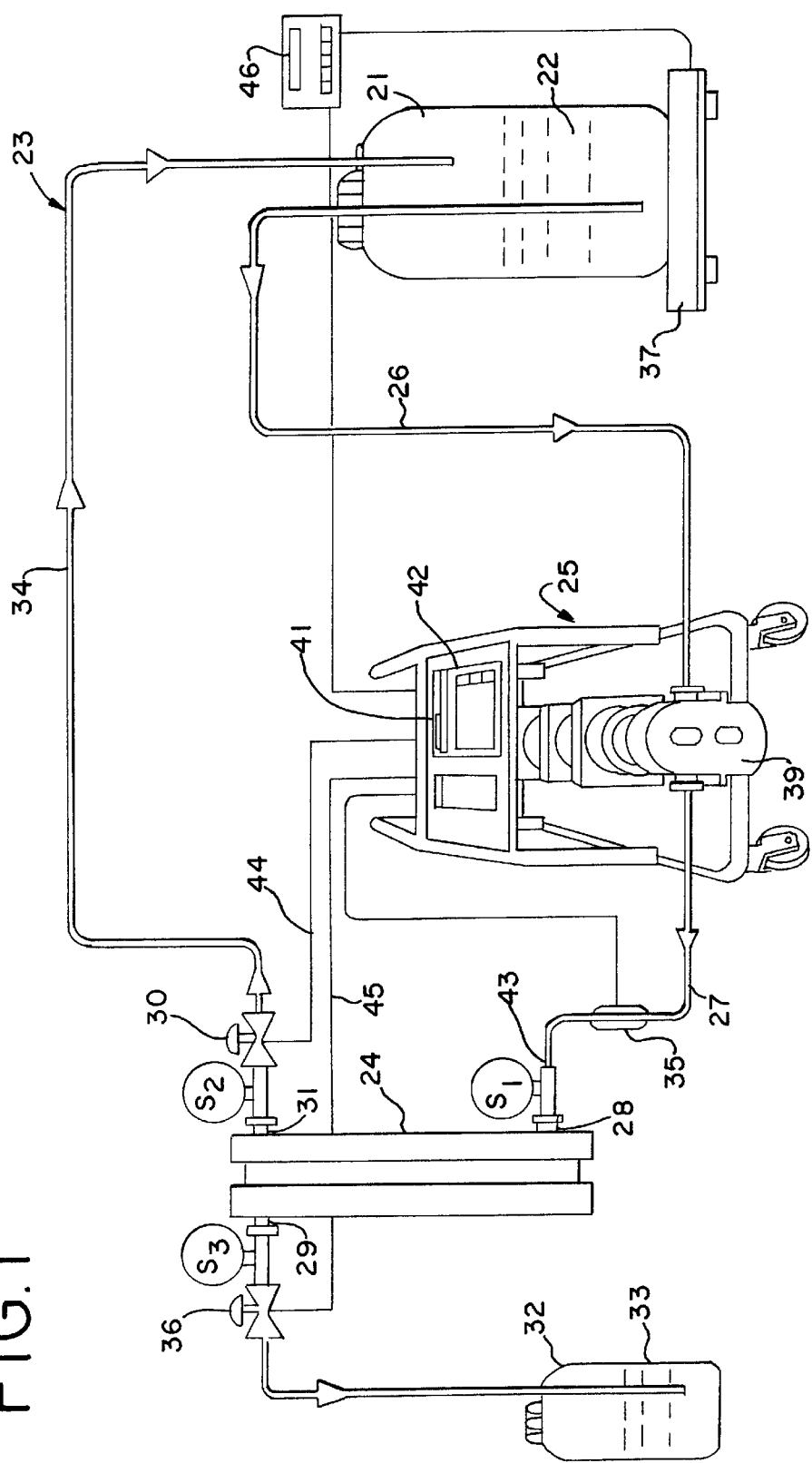
FIG. 1 is a somewhat schematic illustration of a preferred embodiment of an apparatus of the type discussed herein.

A system particularly designed for ultrafiltration, microfiltration and the like is illustrated in FIG. 1. A reservoir 21 for containing a liquid to be filtered 22 is shown in liquid-passing communication with a conduit system, generally designated at 23. A filtration unit 24 also is positioned along the conduit system, as is a processor-controlled pump unit 25.

In this illustrated arrangement, the conduit system 23 includes various lengths of conduit or tubing, such as a conduit length 26 by which liquid 22 passes out of the reservoir 21 by the action of the pump unit 25 on the conduit. In a typical application, the conduit system is hard-piped or comprises scientific or medical tubing which is acted upon by movement-generating components of the pump unit 25. This conduit length 26 opens into a conduit length 27 to complete passage of the liquid 22 from the reservoir to the filtration unit 24. Tubing includes PharMed and Masterflex® silicone pump tubing.

With more particular reference to the filtration unit 24, this includes an inlet 28, a filtrate outlet 29, and a retentate outlet 31. A collector 32 is preferably provided for collecting the filtrate (or permeate) 33 which, by operation of the filtration unit, is separated from the liquid 22 and flows out of the filtrate outlet 25. Retentate which flows out of the retentate outlet 31 is returned to the reservoir by a recycle component 34 of the conduit system 23.

Filtration unit 24 often will take the form of a tangential or cross-flow filtration device. Other filtration units can be used, including those characterized as having an ultrafiltration column. The filter units may be of the type wherein the liquid to be filtered encounters a porous membrane. The preferred filter unit is of the type which incorporates porous hollow fibers, and the flow of liquid is of a generally tangential type or cross-flow type. These filtration units are of types which are generally known. They have a variety of pore sizes which are selected to achieve the desired separation action. Commercially available filtration units include those which are stacked plate and spiral devices which use flat sheet membranes. Others include tubular devices, as well as shell and tube devices which use hollow fiber membranes. Cross-flow or tangential ultrafiltration, diafiltration or dialysis filter units operate on the principle of providing high fluid flow velocity parallel to the membrane surface. Tangential ultrafiltration generally operates best at relatively high velocity flow rates.

Proper functioning of these filtration units is severely hampered as the viscosity and concentration of the circulating retentate increases as its concentration increases. If not properly addressed, this can result in inefficiencies, including the development of an excessive gel layer of solids and/or micromolecules. This buildup is intensified by reducing flow rate in an attempt to address increased viscosity, which gradually and persistently decreases the filtration efficiency and capacity of the filter unit. If proper measures are not taken to effectively address fluctuation and inadequate monitoring of trans-membrane pressure, such as those in accordance with the invention, yield and processing times will be negatively impacted.

In addition, if left unchecked, increasing line pressure or TMP will eventually cause failure and/or leakage in the closed system. Typically, pressure induced failure will be evident in the filter unit and/or in the conduit system. For example, the filter unit and tubing of the conduit system can fail due to excessive internally applied pressure. Alternatively or additionally, seals between the conduit system and other components of the apparatus can fail, and/or the tubing can be blown off of a seat or connection point. Such events will lead to loss of valuable components and potential contamination of the theretofore closed system.

The system illustrated in FIG. 1 further includes at least one flow meter 35 within the conduit system. Suitable in this regard is an electronic flow transmitter, such as a Burkert Model SE35/8035 having a 4–20 mA output. Pressure sensors (S1, S2 and S3) are also shown installed along the conduit system. Sensor S, which is associated with an electronic flow meter signal cable 43, reads the pressure (P1) at the inlet 28. Sensor S2 reads the pressure (P2) at the retentate outlet 31, and sensor S3 reads the pressure (P3) at the filtrate outlet 29.

In tangential flow filtration, the driving force (trans-membrane pressure, or TMP) is the difference between the average of the membrane feed pressure (P1) and the retentate pressure (P2) minus the permeate pressure (P3). This is represented by equation (1) as follows:

$$TMP=(P1+P2)/2-P3 \quad (1)$$

In tangential flow applications where the pump feed pressure (P1), the retentate pressure (P2) and the permeate pressure (P3) are all allowed to change, equation (1) defines the trans-membrane pressure (TMP). Appropriate differential pressure measurements can be made.

Preferably, each pressure sensor is an electronic pressure sensor which detects pressure within the conduit system at its particular location. Means are also provided for transmitting pressure data from each pressure sensor to the processor-controlled pump unit 25. In this manner, the processor-controlled pump unit 25 has virtually instantaneous access to this pressure data. Suitable in-line, electronic liquid pressure sensors are generally known and are available. An example is the Flow-Through pressure sensor, available from Scilog Inc. Often, such a pressure sensor is electronically connected to a preamplifier, which in turn is mounted to an in-out port on the processor-controlled pump unit 25.

At least one valve unit is provided for adjusting pressures within the system. In the illustrated embodiment, a valve 30 is associated with the sensor S2 in order to provide the ability to adjust pressure (P2), a valve control cable 44 being provided. A value 36 is associated with the sensor S3 for adjusting pressure (P3), a valve control cable 45 of 4–20 mA being provided in the illustrated embodiment. A valve also can be associated with the sensor S1. Preferably, the rate of flow into filtration unit 24 is monitored by the flow meter 35 upstream of inlet 28. Each is in signal transmitting communication with the processor component, as generally shown in FIG. 1.

For a given process solution and membrane, an optimal trans-membrane pressure can be empirically determined. The unit according to the invention permits this optimal TMP to be maintained during the process even during increasing concentration of the component of interest in the recirculating system, which increases the viscosity of the recirculating liquid containing the component of interest. Because the system continues to operate at the best TMP for the filter and feed liquid, yield is enhanced while the unit operates in a safe manner to avoid loss of valuable components. This is done while maintaining a flow rate which avoids undesirable increase in gel-layer formation.

When desired, weight data can be input to the processor-controlled pump unit. FIG. 1 illustrates an electronic top-loading scale or load cell 37 having an RS-232 cable transmitting signals between a scale controller 46 and the pump unit 25. Load cell 37 is positioned and adjusted for measuring the weight of the liquid 22 within the reservoir 21. These weight data are electronically transferred to the processor-controlled pump unit 25. When it is desired to measure or weigh the filtrate or permeate which is collected within the collector 32, means are so provided. With the arrangement using balance 37 as illustrated in FIG. 1, this can be reasonably well accomplished by measuring the decrease in the weight of the liquid within the reservoir 21.

Alternatively or additionally, a balance (47 in FIG. 2) can be positioned for directly measuring the weight of the filtrate or permeate 33. Generally speaking, the use of the extra balance allows for enhanced quantitative measurement of the filtrate or permeate. It will be appreciated that the somewhat indirect measurement by monitoring the decrease in the liquid 22 in the reservoir 21 must take into account liquid remaining within the conduit system and the filtration unit, which amounts are not necessarily totally consistent throughout the processing procedure. Various electronic balances can be used. These include the electronic top-loading balances and scales made by manufactures such as Mettler®—Toledo, Sartorius®, and Ohaus® commercially available load cells.

Referring more particularly to the processor-controlled pump unit 25, the illustrated device includes a pump head 39. Pump head can be a peristaltic pump, a lobe pump or other precision pump head. The pump head can be of a two-channel variety, such as a Tandem (Trademark) peristaltic pump head available from Scilog, Inc., Madison, Wis. Two-channel peristaltic pump heads in this regard are described in U.S. Pat. No. 5,340,290, incorporated by reference hereinto. Whatever type of pump unit is used, it is important that it be exceptionally accurate so as to impart a precise flow rate to the liquid in accordance with instructions received from the processor component of the processor-controlled pump unit 25. For example, the Tandem pump can accurately move from between about 2 ml/min to about 2200 ml/min per channel.

The processor-controlled pump unit 25 includes a processor component 41. A control and display panel 42 provides the interface between the user and the processor 41. Included is a display and a series of operator activated controls. These controls allow the operator to input parameters and instructions in accordance with the particular needs of the liquid being subjected to the separation capabilities of the filtration system. The illustrated front panel user interface includes an alphanumeric liquid crystal display (LCD) and a membrane keypad to select operational modes and alarm settings.

Suitable keypad arrangements can be provided. They can include a "soft" key to scroll up or down through the menus. They can include "hard" keys whose function does not change. These keys are used for basic control and programming. A RUN control key executes the selected operational mode and starts the pump 39. A STOP control key interrupts current operational mode and stops the pump. A RATE control key sets the pump rate in ml/min, liters/min or kg/min. A TIME control key displays motor pulses per second. A double arrowhead control key orders clockwise or counterclockwise pump direction. A SWITCH control key and an EXIT control key typically are provided. A STAR (*) control key can be used in pump rate recalibration and also for changing the parameter displayed by the processor-control pump.

Figure 5:
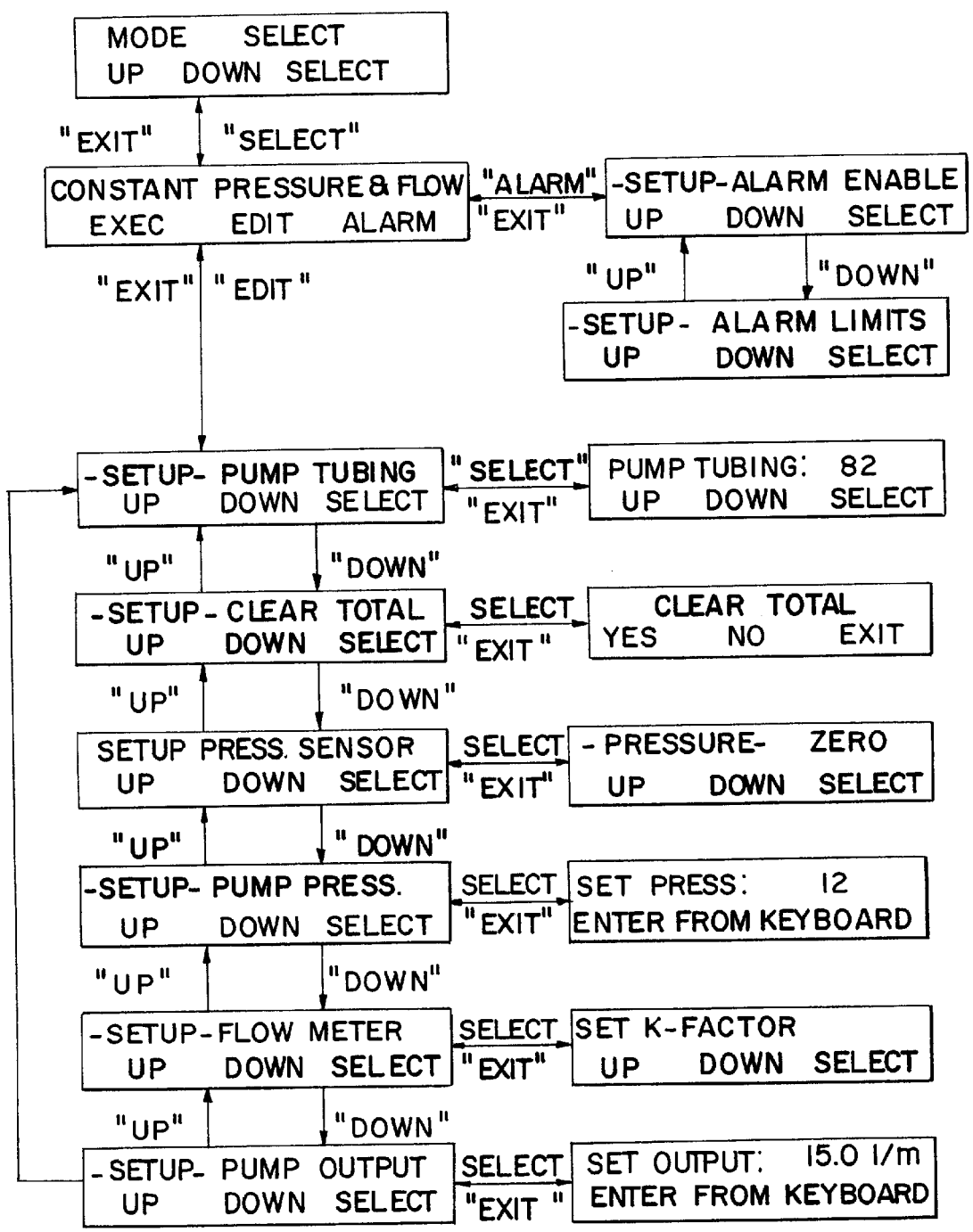
FIG. 5 schematically provides a menu overview of software suitable for use in the processor-controlled pump unit.

FIG. 5 shows a preferred main menu for the logic of the processor, which can control data channel circuitry, which consists of five operational modes. "Up" and "Down" keys are used to scroll through the main menu. Pressing a "Select" key enters a chosen operational mode and enters the first submenu level which provides access to the "Exec" and "Edit" functions. In the "Edit" submode, the pump parameters are selected for filter application. Pressing "Exit" returns to the main menu.

The illustrated operation mode implements constant trans-membrane pressure (TMP). A user-defined TMP can be selected. In the "Edit" submode the pump tubing is selected, and the factory installed calibration tables which relate the pump output in l/min to pump motor speed are selected. In the constant pump rate mode, pump rate in terms of l/min are selected. User-programmable alarm parameters can be selected, such as: Cumulative (Retentate) Volume; Run (Pump) Time; Low Pressure (Low Filter Back Pressure); High Pressure (High Filter Back Pressure); Filtrate (or Permeate) Weight Alarm; as well as two concentration (e.g. UV and conductivity) alarms.

The SETUP operation mode allows the user to select various user preferences and interface options. A Setup: Scale submode provides electronic balance options. A Setup: System Test submode allows check-out of outputs. A Setup: Printer is used for setting up the printer communications parameters, while Setup: Pump allows the user to set various pump user preferences. A Setup: Serial can be provided to define communications parameters of the SERIAL mode. MANUAL allows manual pump speed control, and SERIAL allows remote control of the pump.

Figure 2:
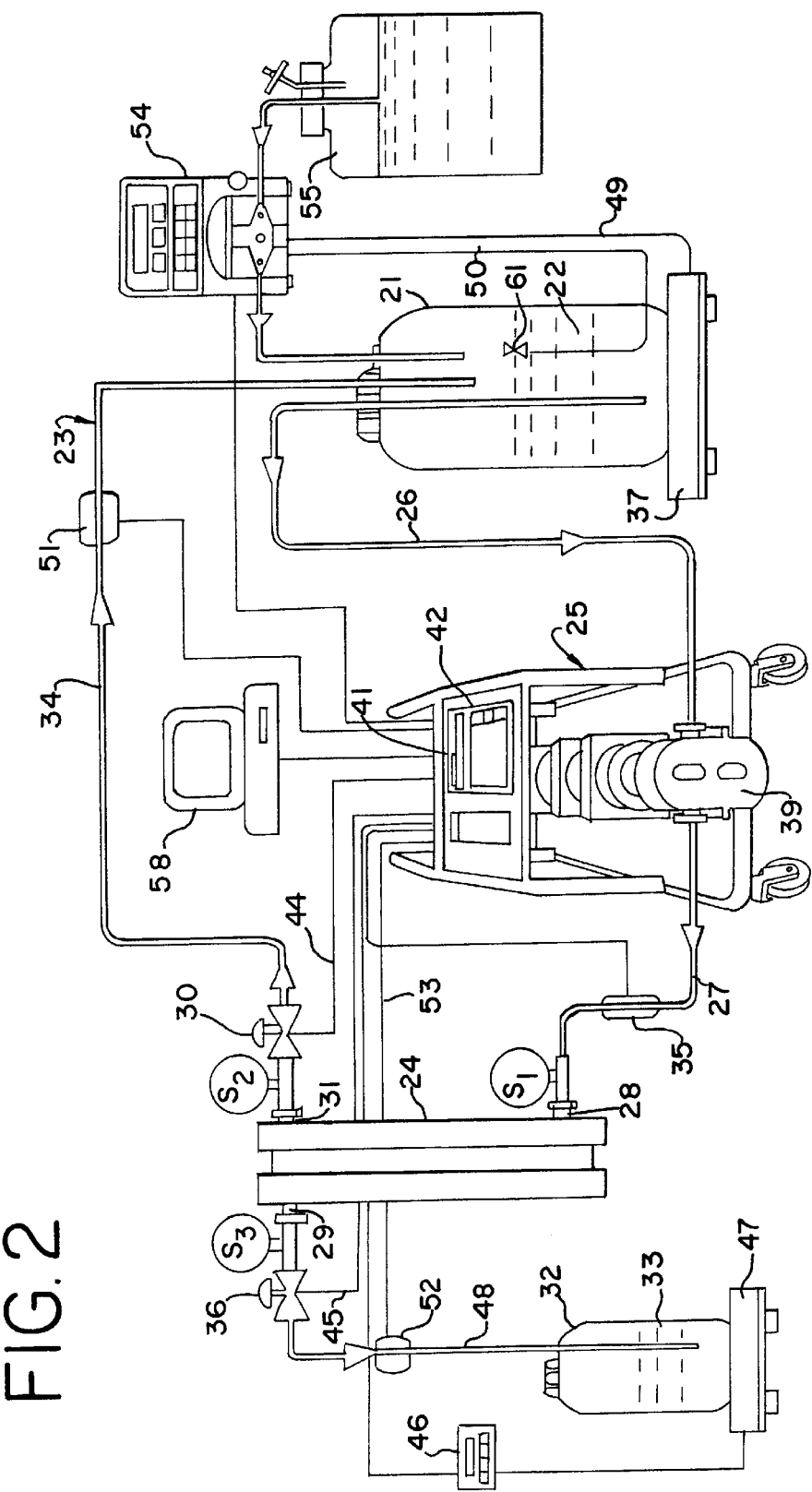
FIG. 2 is a somewhat schematic illustration of other preferred embodiments of the invention especially suitable for diafiltration concentration, derivatization and microparticle coating, also showing an approach which maintains substantially constant retentate volume with an auxiliary pump.

A system particularly designed for diafiltration and microparticle coating is illustrated in FIG. 2. The basic liquid conduit system is similar to one described in connection with FIG. 1 for ultrafiltration and microfiltration. Additional liquid handling elements are added including flow-through detectors for monitoring permeate and/or retentate concentration as well as pumps for the addition, for example, of exchange buffer or reagents.

For example, the progress of a diafiltration procedure can be monitored and quantitated by utilizing an appropriate detector, such as a pH, conductivity, or UV detector, capable of either monitoring the decreasing concentration of the original (undesirable) buffer solution or monitoring the increasing concentration of the exchange (desirable) buffer solution in the retentate line 34. In a typical diafiltration procedure, the protein remains in conduit system 23 by virtue of the selected filter pore size that prevents proteins from migrating across the filter into the permeate line 29. Thus, during the concentration step of a diafiltration procedure, an increasing concentration of the protein (product) can be monitored with a detector 51 in retentate line 34.

An example of a suitable detector is a UV detector. By placing an UV detector in the permeate/filtrate line 29, the integrity of the filter membrane can be monitored during the diafiltration process. A rupture of the membrane would allow protein to appear in the permeate line 29. An increased UV detector output indicates the presence of protein and thus a failure of the filter element. This type of filter failure can be detected and acted upon (diverting the permeate stream) by the processor-controlled pump unit which monitors the output of the UV detector when it is located in the permeate line 29.

The type of concentration monitor and its relative position within the tangential flow filtration system (conduit system 23) is primarily determined by the functionality of the chemical species that is being monitored. If the solution acidity of the permeate or retentate changes during the filtration process, a pH flow-through monitor can be advantageously used in the permeate line. A flow-through conductivity monitor would be appropriate if the relative conductivity of the retentate or permeate changes during the diafiltration process. This may be the case when the original solution matrix has a high conductivity (due to high salt concentration) while the exchange buffer solution may have a relatively low conductivity (due to the presence of weak organic acids/bases). In all cases the output changes of the concentration monitors are used by the processor-controlled pump unit 25 to detect user-defined alarm conditions and/or to activate valves for diverting permeate (line 29), retentate (line 34) or to provide reagent access.

Other specialized flow-through monitors, for example fluorimeters or turbidity monitors, can be advantageously used when derivatizing reactions are carried out within the filtration system (conduit system 23). For example, a liquid suspension of chemically modified beads and free immuno-proteins are recirculated through conduit system 23 and activated by introducing chemical reagents to couple free immuno-proteins to the surfaces of the suspended beads. The reagent introduction, progress and completion of the coupling reaction can be monitored in the retentate line 34. Removal of excess reagent from the filtration system after the coupling reaction is completed can by monitored and quantified by means of such specialized flow-through detectors in the retentate line 34 (decreasing concentration of excess reagent) or in the permeate line 48 (increasing concentration of excess reagent). Such a permeate line monitor or detector is illustrated at 52, which can be in communication with the controller by a 4–20 MA control line 53.

The introduction of reagents into the process reservoir 21 can be achieved by a separate reagent pump 54 under the control of the processor-controlled pump unit 25. Examples of suitable reagent pumps include those available from Scilog, Inc. such as a ChemTec tandem auxiliary pump. This is especially suitable when processing data from the retentate scale 37 though line 49 between the retentate scale 37 and the auxiliary or reagent pump 54.

FIG. 2 shows an alternate embodiment for reagent handling. The reagent is pumped into the reservoir 21 by an auxiliary reagent pump in response to data from a liquid level transducer 61 generating data transmitted across line 50. An example of a suitable auxiliary reagent pump 54 for this embodiment is an Expert tandem pump available from Scilog, Inc.

Figure 3:
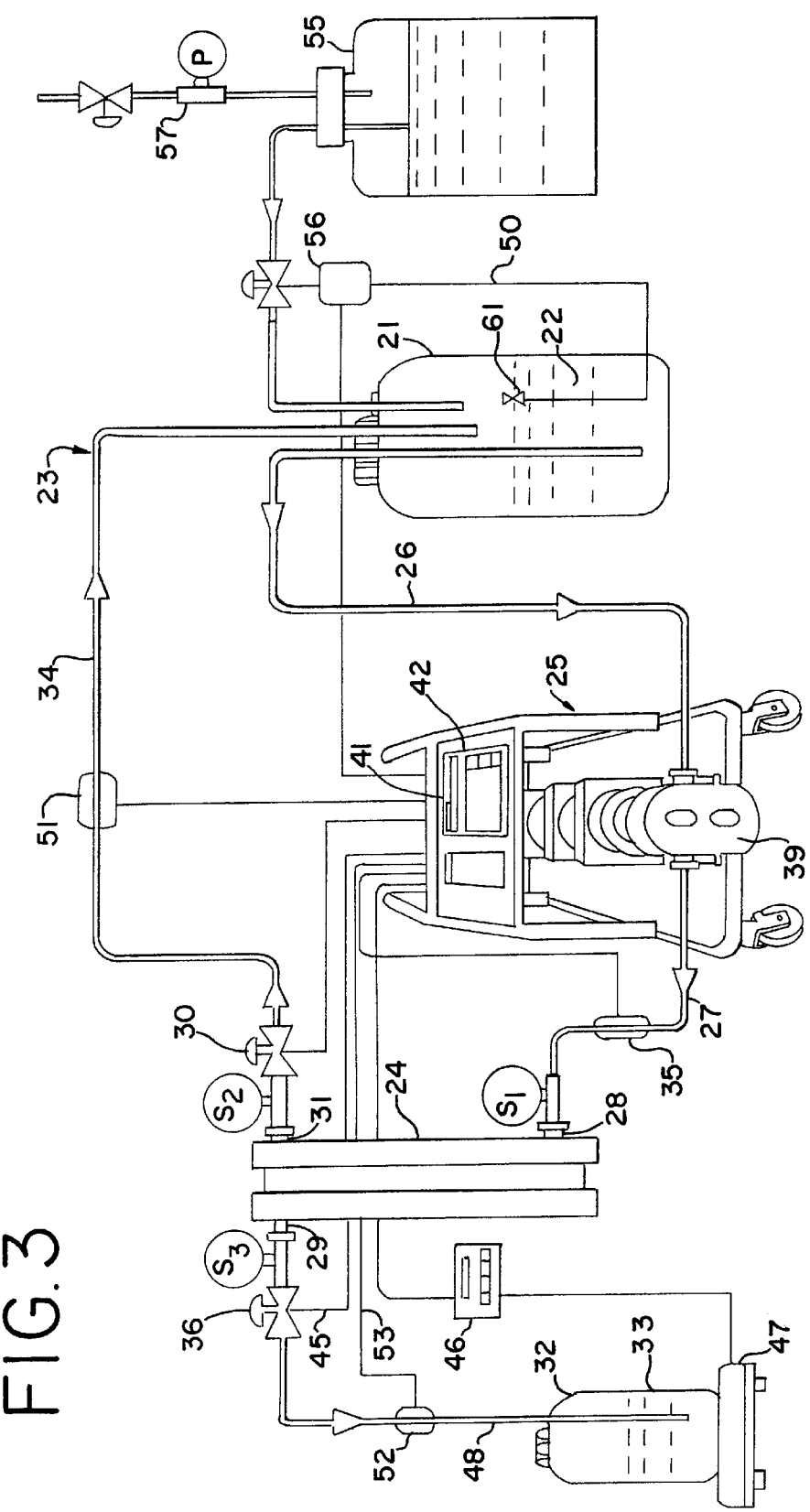
FIG. 3 is a somewhat schematic illustration of another preferred embodiment along the lines of the FIG. 2 embodiment and which incorporates a level sensor controller in maintaining substantially constant retentate volume.

FIG. 3 shows an embodiment where the liquid level sensor or transducer 61 is used and the reagent can be stored in a pressurized stainless steel container 55. Reagent addition can be controlled by a processor-controlled electrically operated shut-off valve 56, with pressurized air being provided at unit 57.

Illustrated in FIG. 2 is on optional remote control system 58. This can take the form of an off-site computer or other control means. Control system 58 has the capability of control, data collection and remote uploading of programs executable by the processor-controlled pump unit 25 without significant interruption of liquid processing activity. Such can be used with any embodiment.

A typical operation of the filtration system as illustrated now will be described, with reference being made to the data flow schematic of FIG. 4a and FIG. 4b. This arrangement illustrates how trans-membrane pressure can remain constant while the viscosity of the feed solution increases during its ultrafiltration.

As described in more detail in U.S. Pat. No. 5,947,689, the filter line pressure and/or TMP as well as the filtrate weight can be continuously monitored. For example, when the line pressure limit is exceeded by a set alarm value, the processor-controlled pump unit will stop pumping and/or provide an alarm signal. An optical encoder and associated circuitry are preferably provided to count and control the pump motor rotations necessary to implement a selected pump rate. The illustrated processor component 41 incorporates a microprocessor-based controller, and a battery-backed EPROM stores the filtration control software.

The software includes a calibration table which relates the pump motor rate (RPM) value with the pump output in terms of l/min or ml/min. Typically, a calibration table includes data to ensure an accurate volume per number of pump motor turns for a particular tube size. Thus, the operator selects the pump tubing by number (e.g. in accordance with standard pump tubing values in the table). Processor component 41 contains a permanent, factory installed calibration table for each pump tube size. The calibration table relates the pump motor RPM to the pump output in terms of l/min or ml/min. Recalibration capabilities can adjust for differences in pump tube formulation/manufacture, as well as pump tube wear over time which may cause the pump output to change.

In the illustrated embodiment, at least five different alarm parameters are programmable by the operator by operation of the control logic and/or its limit-setting data logic. These user-selected alarm parameters include a high pressure alarm limit to monitor plug-up conditions of the filtration device, typically associated with the pressure sensor 35. A low pressure alarm limit also is programmable in order to monitor sudden lowering of pressure within the system, such as when tube connections have failed and the process solution possibly is being lost. This function can be responsive to data received from one or more pressure sensors.

A filtrate weight alarm limit also can be set in order to quantitatively monitor the amount of solution collected in the collector 32. When the filtrate weight is directly measured, a stop and/or alarm function will proceed when that limit amount is attained. When the filtrate weight is to be indirectly monitored by virtue of weight data obtained from electronic top loading balance 37, the filtrate yield is calculated by the software based upon the weight differential of the liquid in the reservoir 21 at time=0 (start of filtration) and at some later time. The operator can also set a run time alarm to stop or signal when a user-defined filtration time has elapsed. A retentate volume alarm limit also can be set in order to monitor the solution volume which is pumped by the pump head 39. Two additional alarms are available for monitoring the outputs of concentration detectors.

For any of these alarm parameters, the operator can select one of three options: Alarm Off, Signal Only or Pump Stop.

The latter can be combined with emitting a signal as well. The signal can be audible, vibrational and/or visible. All of the options except for Alarm Off are implemented when the operator-defined alarm limits are exceeded. For example, when the high pressure limit is set at 10.0 psi, the processor-controlled pump unit 25 will stop and/or provide an alarm signal when the filter back pressure, typically as measured at the pressure sensor 35, exceeds 10.0 psi.

Editing details are shown in FIG. 5. Pressing the "Up" and "Down" keys makes a selection, and "Select" is pressed to implement that selection of alarm values or initial settings for the unit. Appropriate software and hardware are provided in a conventional manner in order to permit a printout by way of a printer (not shown) of desired parameters. Typical parameters thus reported or readily calculated are elapsed filtration time in minutes, feed rate, collected filtrate weight in grams, retentate volume in milliliters, trans-membrane pressure, pressures at each pressure sensor, control valve settings, concentration detector outputs as well as pump status changes and alarms as they occur.

With further reference to the ability of the filtration system of the invention to achieve constant trans-membrane filtration despite increasing viscosity, the pressure data, as well as other data noted, are continuously fed back to the processor component 41. The processor component continuously inputs the data into, in effect, equation (1). The unit then transmits a signal or signals in order to modify the appropriate pressure so as to maintain the constant TMP value. The signal can be to modify pump speed and/or to modify the size of the valve passageway, such as in either or both of the valves 30, 36. In essence, as the viscosity of the recirculating liquid increases, the TMP would increase without decreasing the pump speed and/or manipulating the valve(s).

Valves used in this connection preferably are motor-driven, multi-turn valves. A 4–20 mA (or 0–5 volt DC) analog signal moves the valve in the open direction or the closed direction. For example, with a valve in which a 4 mA signal will completely close the valve and a 20 mA signal will completely open the valve, a 12 mA signal would leave the valve half open. Thus, without modifying the pump rate into the filtration unit, the valves can be used to modify the pressure drop across the filtration unit at either or both outlet passages. An example of a suitable combination to achieve this is a SciPro smart controller available from Scilog, Inc., Middleton, Wis., together with equipment such as the motor-driven, multi-turn valves which are diaphragm valves or needle valves. A suitable flow meter is of the in-line type which is electronically monitored.

In determining trans-membrane pressure, the inlet pressure at sensor S1 is determined largely by the dimensions and porosity of the tangential-flow filtration device (when that type of device is used), the viscosity of the liquid being pumped, and the pump rate. For example, pressure at sensor S1 is increased by increasing the pump rate noted by the flow meter 35. Sensor S2 monitors the pressure P2, which can be adjusted by sending a signal to the valve 30 for modifying the retentate outlet pressure. Sensor S3 monitors the pressure P3 at the filtration outlet 29, which can be modified by operation of the valve 36.

As liquids or solutions are moved through the pumphead 39, the pump output will vary with changes in the solution viscosity and with changes in the back-pressure at the filtration unit inlet 28. When it is desired to maintain a constant pump output, the flow out of the pumphead and into the inlet 28 will be monitored by the flow meter 35. When the flow is reduced for either reason, flow can be increased by speeding up the pumphead, for example, until the flow meter indicates that the desired flow level is occurring. If no adjustments are made regarding trans-membrane pressure, maintaining a constant pump output can affect the trans-membrane pressure. If it is desired to avoid such a change in TMP, the TMP can be maintained as discussed hereinabove.

The inlet pressure P1 is a variable that is dependent primarily on the pump rate, viscosity of the liquid being pumped, and the physical dimensions of the tangential-flow device. The rate of feed into the tangential-flow device controls the formation of the filter gel layer. Such a gel layer retards filtrate flux across the membrane. A typical filter is accompanied by manufacturer's guidelines for filtration feed rate. Measuring permeate collection rate at various feed rates allows one to experimentally determine the minimum tangential velocity or minimum feed rate for the particular system. The feed rate just prior to the one resulting in a significant drop of permeate collection rate is the minimum feed rate for the filtration system.

Permeate collection rate can be monitored by using flow sensors or scales. For example, the permeate collection rate can be established by monitoring the retentate reservoir weight or by electronically monitoring the permeate flow rate. Any decrease in reservoir weight is due to removal of permeate. Alternatively, the collection rate can be determined by monitoring the weight of the permeate collection reservoir over time. However determined, the permeate collection rate is continuously monitored and displayed, together with the pressures, the TMP and the feed rate. This is accomplished by the processor component 41.

By using the equipment and method, optimal TMP conditions for a given process solution and filtration device can be determined. This information can be readily obtained by monitoring the solution being processed by the equipment and method. The permeate collection rate is monitored while modifying one variable at a time, particularly the variables of feed rate, P1, P2 and P3. In this instance, the set of variables are optimal (meaning they provide the optimal trans-membrane pressure condition) when the permeate collection rate has been maximized while staying within the safety limitations of the filtration device.

It is important to avoid excessive transmembrane pressures. This avoids exceeding the pressure limits of the filtration system, leading to a safety concern, while also threatening the physical integrity of living cells, for example in case of cell suspensions or the like. The relationship between solution viscosity, trans-membrane pressure and permeate flow through a microporous membrane can be described by the Hagen-Poiseuille Law:

$$J=ER(TMP)/8VX,$$

where J is the permeate rate (flux), E is the membrane porosity, R is mean pore radius, V is the viscosity of the fluid, and X is the thickness of the membrane. It will be noted that, for a constant permeate rate, any increase in solution viscosity will give rise to a proportional increase in trans-membrane pressure.

The present filtration approach is particularly advantageous in the concentration of cell suspensions. Solvent is continuously removed as filtrate, thereby increasing the concentration and viscosity of the remaining retentate. Increasing retentate viscosity modifies the TMP. Reducing the pump rate into the filtration device would significantly increase gel-layer formation and thus reduce filtrate yield. By means of the monitoring of pressures and TMP and adjusting the valves and/or pump rate, the optimal TMP which has been determined for the particular system is maintained, thereby providing optimal filtration conditions which are automatically and safely maintained while providing high filtrate yields. These are achieved because the system maintains the best trans-membrane pressure substantially throughout the process in order to remove the most material being collected under the most favorable conditions and within the minimum time to collect the volume.

The system and method provides the ability to accurately measure P1, P2 and P3 over a wide range of conditions. It is important that the pressures be determined with sufficient accuracy and precision to allow simultaneous calculation and display of the actual transmembrane pressure. When the system incorporates pulsating filtration pumps such as peristaltic pumps and lobe pumps, pulsating outputs result in oscillating pressure readings which may vary by as much as +/−10 psi. This undesirable oscillation can be successfully addressed by logic preferably provided by the system. Each pulse generated by the pump is associated with a peak pressure value, a lowest pressure value, and values in between. Lack of precision and accuracy results unless results are taken to address this oscillation. A "capture and hold" algorithm is used to select only the peak pressure value for each analog signal. These peak pressures are thus selected, displayed and used to calculate the trans-membrane pressure. The system automatically updates these peak pressures with each pulse generated by the pump. For a given pump output, the peak pressure values are extremely reproducible (a variation of less than 1%), allowing for accurate and precise TMP calculation.

Figure 4A:
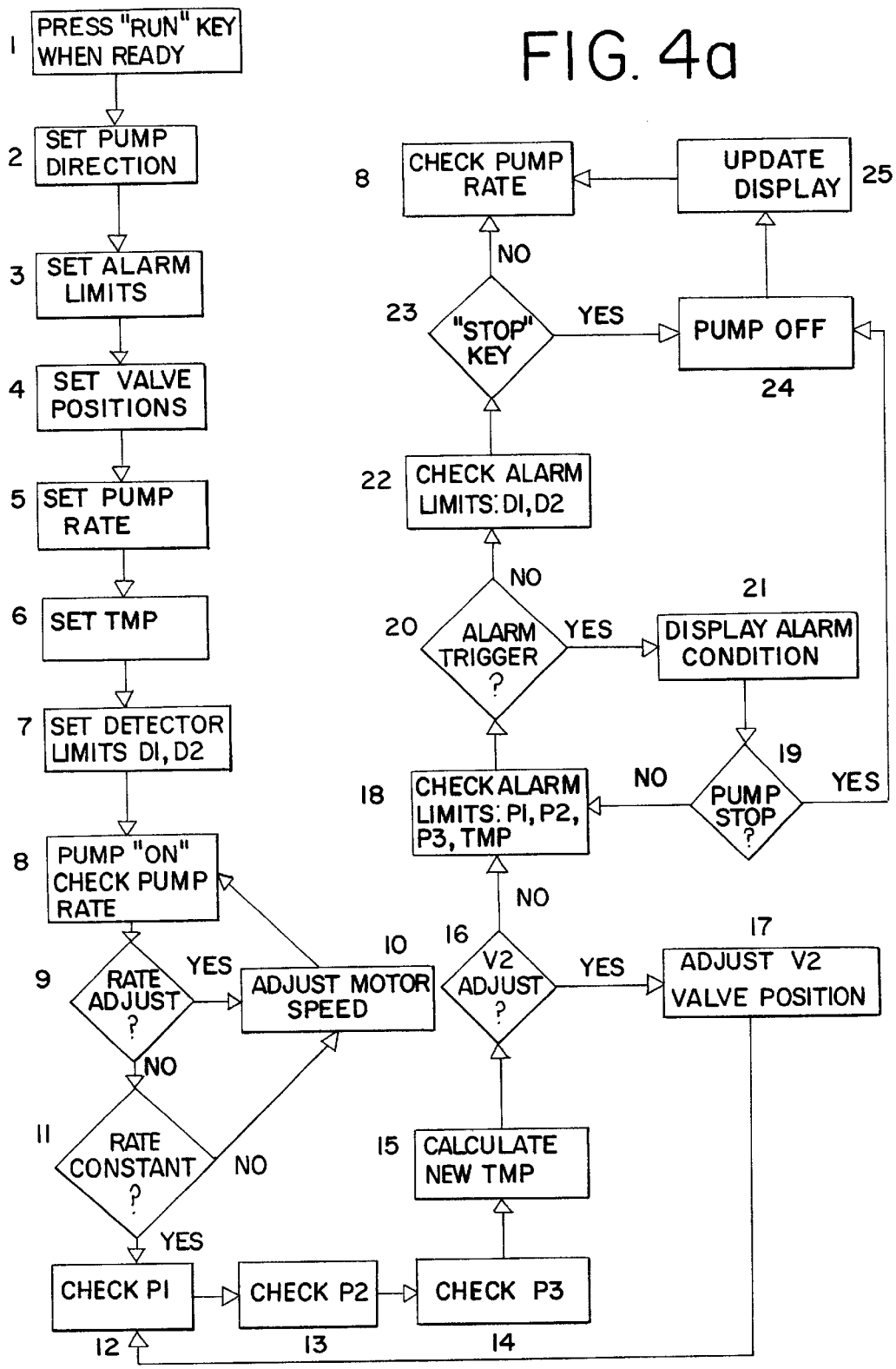
FIG. 4a is a schematic data flow chart associated with a system for maintaining filtration under constant transmembrane pressure conditions by modifying pump rate and/or valve restrictions.
Figure 4B:
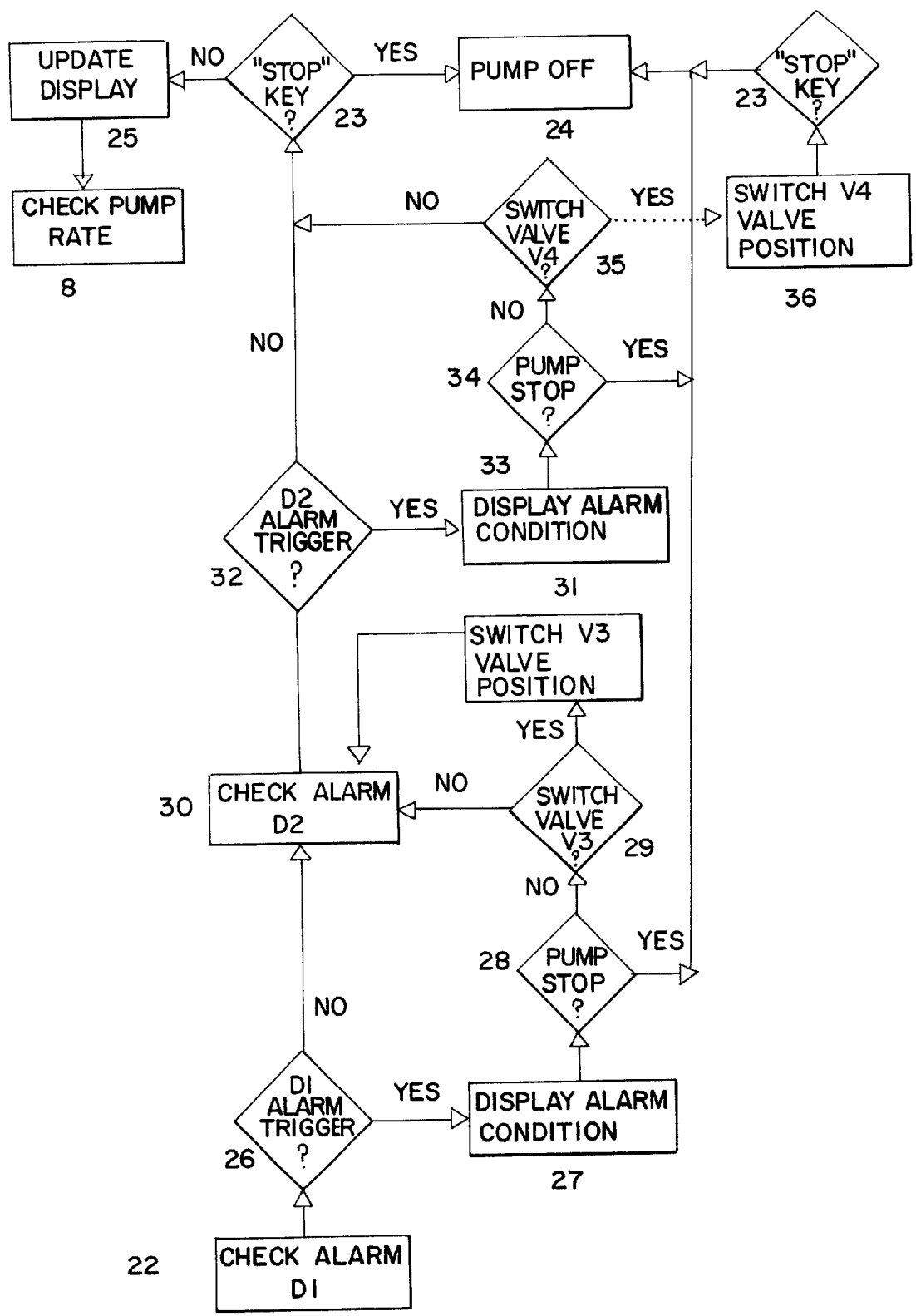
FIG. 4b is a schematic data flow chart providing further details of the check alarm limits embodiment which can be added to the FIG. 4a system.

Referring especially to the data flow logic illustrated in FIG. 4a and FIG. 4b for the preferred embodiments, desired settings are made with respect to pump direction, any desired alarm limits, and the like, such as by using a selection menu illustrated in FIG. 5. This includes setting the pump rate and the TMP previously determined to be optimal for the particular filtration system and process solution.

If the unit is to be used in a manner so as to maintain a constant pump output, the pump rate is monitored such as by the flow meter 35. If the pump rate varies, the motor speed of the pump head is adjusted to maintain the constant rate.

During operation of the unit, pressures P1, P2 and P3 are monitored and are constantly used to calculate the current TMP. If the TMP begins to fluctuate from its set, optimum value, valve adjustments automatically are made. A typical adjustment is at sensor S2, and this is illustrated in FIG. 4a and FIG. 4b. There is feedback as to the effect of this adjustment on each of the pressures, the TMP value is checked and, if constant, processing continues. If an alarm limit has been set, this can be triggered to provide an audible and/or visual signal or to turn off the pump unit.

In a general example of the system and method, a process solution, containing components to be separated by filtration, is pumped into the filtration unit 24, a tangential-flow filter. This filter unit includes one or more porous membrane sheets arranged in such a way that process solution flows parallel to the membrane surface and exits at the retentate outlet. Solvent, molecules, and particles smaller than the membrane pores pass through the membrane and are collected as permeate through the filtrate outlet 29. For each pass through the filtration unit, only a small portion of the total process solution is collected as permeate, while the remainder as returned to the process solution reservoir 22 and re-circulated by the processor controlled pump unit 25. More specific examples in this regard follow.

EXAMPLE 1

This example illustrates how the system was used to separate extracellular protein (IgG) from a suspension of cells. In this example, a 500 liter suspension of Chinese Hamster Ovary (CHO) cells was the process solution placed within the reservoir 21. The filtration system included a SciPro processor controlled pump unit having a peristaltic pumphead from Cole-Parmar, and an I/P High Precision pumphead. The filtration unit was a Sartocon II cross-flow filtration system available from Sartorius using a 0.45 micrometer Hydrosat cassette. The processor unit was set with the following operating conditions: the cell concentration within the 500 liter batch was 3×10 to the $6^{th}$ cells/ml. The membrane surface area was 0.6 $m^2$, with the cross-flow recirculation rate being 12 liters/min using a number 88 Masterflex™ pump tubing. The inlet pressure (P1) was initially 10 psi; the retentate pressure (P2) was initially 5 psi; and the permeate pressure (P3) was initially 2.5 psi, achieved by adjusting valve 36. The constant trans-membrane pressure was 5.0 psi. Cell-free media was collected as permeate, while the retentate contained the cell suspension, which became increasingly concentrated as the filtration progressed.

The cell suspension was concentrated 250 times, down to 2.0 liters over a 3.5 hour processing time period. The inlet pressure remained constant for the first 2.5 hours, and slowly increased to 15 psi during the last hour of processing. This increase in the inlet pressure was due to the increased cell density and the associated viscosity increase of the retentate. In response to this increased inlet pressure, the valve 30 at the Sensor S2 progressively opened, resulting in a simultaneous decrease in the retentate pressure through the outlet 31, which was required to maintain the TMP constant at 5.0 psi. The permeate pressure flow by the sensor S3 remain constant at 2.5 throughout the filtration run. The average system flux over the 3.5 hours was 237 liters/hr–$m^2$ at the TMP of 5 psi.

The concentration of the cell suspension was accomplished without affecting the viability of the cells, which was confirmed by the successful utilization of the cells in a subsequent procedure.

EXAMPLE 2

The 498 liters of media collected in Example 1 were subjected to a subsequent step of a multi-step separation strategy. The collected media containing the extra-cellular protein (IgG) was concentrated by ultrafiltration within the same type of system. The particular system also included a SciPro processor controlled pump unit of Scilog, Inc., having a Fristam Model 55S lobe pumphead. This system was used to concentrate the dilute protein solution from 498 liters to 2.0 liters, a concentration of approximately 250 times. The filtration system was a Sartocon II cross-flow filtration system using a 20000 MWCO "Ultrasart" cassette. The membrane surface area was 0.7 $m^2$, the recirculation rate being 17 liters/min. The inlet pressure (P1) was 30 psi, the retentate pressure (P2) was 10 psi, and the permeate pressure (P3) was 0 psi. The trans-membrane pressure was constant at 20 psi during the 4.5 hour processing time.

With this tangential-flow filtration device, the protein remained in the recirculating retentate, and the protein solution became increasingly concentrated. The protein-free media was collected as permeate.

The 30 psi inlet pressure remained constant for the first 4 hours, after which the inlet pressure slowly increased to 35 psi. This increase in inlet pressure was due to increasing viscosity of the protein solution (retentate) which became increasingly concentrated as the ultrafiltration progressed. In response to the increased inlet pressure, the valve 30 at the sensor S2 progressively opened, resulting in a simultaneous decrease in the retentate pressure 25 psi. This decrease was required to maintain the constant TMP of 20 psi. The permeate pressure remained constant throughout the filtration run. The average system flux over the 4.5 hours was 158 liters/$m^2$-hr at the 20 psi TMP.

An electronic flow transmitter (Burkert Model SE 35/8035) with a 4–20 mA output was used to control the pump output of the lobe pump. The lobe pump, as is typical of lobe pumps, has its output affected both by solution viscosity and back-pressure. The system was able to maintain a constant pump rate of 17 liters/minute by having the flow meter transmitter signal control the pump motor speed to this desired level. Thus, increasing solution viscosity and pressure tend to change pump output, which is automatically compensated by the closed loop control feature so that the pump motor speed is restored to the original pump output setting.

It will be appreciated that FIG. 4a and FIG. 4b illustrate operation of preferred embodiment set ups for achieving optimal filtration yield. This illustrates pump motor and valve control incorporating detector monitoring. Resulting enhanced control optimizes filtration yield. Item 22 in FIG. 4a "Check Alarm Limits: D1, D2" refers to input from detector or monitor 51 (D1) and from detector or monitor 52 (D2). Further details of this operation are found in FIG. 4b.

The embodiments have features as follows. Some can use two electronic scales or load cells as shown in FIG. 3. Scale 47 monitors permeate collection and is used for controlling same, while scale 37 monitors in order to maintain a constant weight/volume of the retentate reservoir. This and other illustrated configurations allow "set-and-forget" automation that is economically useful in procedures involving diafiltration, concentration and/or derivatization.

Use of an auxiliary pump 54 as shown in FIG. 2 can read scale or load cell 37 to maintain a constant weight/volume of retentate by pumping solution from the reagent reservoir 55 to the retentate reservoir 21. The auxiliary pump transfers solution in response to and at substantially the same rate as permeate collection rate monitored by scale 47. When pump 54 is, for example, a ChemTec unit, same generates an alarm signal (e.g. for stopping pumping action of pump 25), if the auxiliary pump is unable to maintain a constant retentate weight/volume. The pump 54 can operate independently or under the control of the pump 25.

Use of an auxiliary pump as shown in FIG. 2, can respond to the output of a liquid level transducer 56. If the liquid level inside the retentate reservoir drops below the original solution level, the pump 54, such as an Expert pump, starts transferring solution from the exchange buffer reservoir 55 to the retentate reservoir 21. The Expert pump stops when the original solution level has been re-established in the retentate reservoir. The Expert pump generates an alarm signal (e.g. for stopping the pumping action of pump 25) if the Expert pump is unable to maintain a substantially constant retentate liquid level (constant retentate volume). The Expert pump can operate independently or under the control of the pump 25.

A level sensor controller 56 (commercially available), as shown in FIG. 3, is capable of responding to the output of a liquid level tranducer. If the liquid level inside the retentate reservoir 21 drops below the original solution level, a valve is opened (activated by the level sensor controller) allowing the transfer of solution from a pressurized exchange buffer reservoir 55 to the retentate reservoir. The valve closes when the original solution level has been re-established in the retentate reservoir. The level sensor controller generates an alarm signal (e.g. stopping the pumping action of the pump 25) if the level sensor controller 56 is unable to maintain a substantially constant retentate liquid level (constant retentate volume). The level sensor controller can operate independently or under the control of the pump 25.

Including one or more flow-through detectors located in the permeate line, retentate line or feed line of conduit system 23 is for the purpose of monitoring and controlling solution additions to the retentate or permeate reservoirs (of chemical reagents or exchange buffer) or solution additions anywhere along conduit system 23. When user-defined concentration alarm levels are attained, the processor controlled pump unit 25 stops pumping or, alternatively, this pump will activate one or more valves (not shown) for the purpose of collecting product, for diverting undesirable liquid components, for accessing reagents and/or for introducing cleaning solutions into conduit system 23.

The same flow-through detectors, as described in the preceding paragraph can also be used for monitoring the progress of the ultra/diafiltration process and/or for monitoring the integrity, i.e. safety and remaining usefulness of the filtration device. The pump 25 has input capabilities for monitoring detector signals and provides software for user-definable alarm limits and conditions. When user-defined concentration alarm limits have been attained, the pump 25 stops pumping or, alternatively, the pump 25 will activate one or more valves (not shown) for the purpose of collecting product, for diverting undesirable liquid components, for accessing reagents or for introducing cleaning solutions into conduit system 23.

Dip-type transducers, capable of being immersed into the retentate reservoir or permeate collection reservoir, are for the purpose of monitoring concentration changes in either or both reservoirs during micro/ultra/diafiltration. The pump 25 has input capabilities for monitoring detector signals and provides software for user-definable alarm limits and conditions. When user-defined concentration alarm limits have been attained, the pump 25 stops pumping or, alternatively, the pump 25 will activate one or more valves (not shown) for the purpose of collecting product, for diverting undesirable liquid components, for accessing reagents or for introducing cleaning solutions into conduit system 23.

It will be understood that the embodiments of the present invention which have been described are illustrative of some of the applications of the principles of the present invention. Various modifications may be made by those skilled in the art without departing from the true spirit and scope of the invention.

What is claimed is:

1. An apparatus for high-precision separation of pharmaceutical or biotechnology liquids while maintaining a substantially constant trans-membrane pressure across, and a substantially constant feed rate into, a separation unit of the apparatus, comprising:
   a reservoir for containing a pharmaceutical or biotechnology liquid, the liquid containing filterable material dissolved or suspended within a carrier liquid;
   a separation unit having an inlet, a filtrate outlet and a retentate outlet, said separation unit receives the liquid to be filtered through the inlet and separates at least some of the filterable material therefrom which passes as filtrate through said filtrate outlet, and a retentate of the carrier liquid and residue filterable material passes from the retentate outlet;
   a processor-controlled pump unit which controls movement rate of the liquid through the filtration unit;
   a conduit system which, by operation of said processor-controlled pump, directs the liquid to be filtered from said reservoir to said inlet of the separation unit and from the retentate outlet for return passage to said reservoir;
   at least one detector positioned along a location of said apparatus downstream of the separation unit for monitoring a parameter of the liquid within said apparatus and for transmitting data on the parameter to the processor-controlled pump;
   at least one valve downstream of the separation unit for modifying pressure within said apparatus;
   said processor-controlled pump unit includes control logic which receives said data from said detector, calculates the trans-membrane pressure across the filtration unit from said data, compares the thus calculated trans-membrane pressure with a selected trans-membrane pressure for the pharmaceutical or biotechnology liquid undergoing high-precision separation, and if a deviation between the calculated and selected trans-membrane pressure occurs, signals said valve to operate to vary the pressure at said detector so that the calculated trans-membrane pressure is made to substantially coincide with the selected trans-membrane pressure; and
   a flow meter along said conduit system between said pump unit and said inlet of the separation unit, said flow meter monitors flow value thereat, which is transmitted to said control logic which directs the pump unit to modify the flow value to maintain a substantially constant feed rate into the filtration unit which substantially coincides with a selected flow value.

2. The apparatus in accordance with claim 1, wherein said detector is a pH detector, a conductivity detector, a UV detector or a pressure sensor.

3. The apparatus in accordance with claim 1, further including an inlet pressure sensor upstream of the separation unit and a further pressure sensor downstream of the separation unit, and the control logic receives data from both pressure sensors to calculate, compare and, if needed, modify pressure to maintain the selected trans-membrane pressure.

4. The apparatus in accordance with claim 3, wherein said further pressure sensor senses, and said valve modifies, the pressure generally at said retentate outlet.

5. The apparatus in accordance with claim 1, further including a unit which detects the feed rate across the separation unit and the amount of filtrate which passes through the filtrate outlet, and said control logic receives feed rate and filtrate amount data from said unit whereby a feed rate at which a significant drop of filtrate collection rate occurs is determined to be a minimum feed rate for the apparatus.

6. The apparatus in accordance with claim 1, wherein said control logic includes a limit setting component which receives a user-input limit for low pressure data from said pressure sensor, and said control logic monitors said low pressure data and signals that the limit for low pressure has been attained.

7. The apparatus in accordance with claim 1, wherein said control logic includes a limit setting component which receives a user-input limit for high pressure data from said pressure sensor, and said control logic monitors said high pressure data and signals that the limit for high pressure has been attained.

8. The apparatus in accordance with claim 1, further including a flow-through detector along said conduit system for monitoring and controlling addition of solutions into the conduit system or into the reservoir and for monitoring and controlling removal of liquids.

9. An apparatus for high-precision separation of pharmaceutical or biotechnology liquids while maintaining a substantially constant trans-membrane pressure across a separation unit of the apparatus, comprising:

a reservoir for containing a pharmaceutical or biotechnology liquid, the liquid containing filterable material dissolved or suspended within a carrier liquid;

a separation unit having an inlet, a filtrate outlet and a retentate outlet, said separation unit receives the liquid to be filtered through the inlet and separates at least some of the filterable material therefrom which passes as filtrate through said filtrate outlet, and a retentate of the carrier liquid and residue filterable material passes from the retentate outlet;

a processor-controlled pump unit which controls movement rate of the liquid through the filtration unit;

a conduit system which, by operation of said processor-controlled pump, directs the liquid to be filtered from said reservoir to said inlet of the separation unit and from the retentate outlet for return passage to said reservoir;

at least one detector positioned along a location of said apparatus downstream of the separation unit for monitoring a parameter of the liquid within said apparatus and for transmitting data on the parameter to the processor-controlled pump;

at least one valve downstream of the separation unit for modifying pressure within said apparatus;

said processor-controlled pump unit includes control logic which receives said data from said detector, calculates the trans-membrane pressure across the filtration unit from said data, compares the thus calculated trans-membrane pressure with a selected trans-membrane pressure for the pharmaceutical or biotechnology liquid undergoing high-precision separation, and if a deviation between the calculated and selected trans-membrane pressure occurs, signals said valve to operate to vary the pressure at said detector so that the calculated trans-membrane pressure is made to substantially coincide with the selected trans-membrane pressure;

an inlet pressure sensor upstream of the separation unit and a further pressure sensor downstream of the separation unit, and the control logic receives data from both pressure sensors to calculate, compare and, if needed, modify pressure to maintain the selected trans-membrane pressure; and another pressure sensor and another valve which respectively senses and modifies the pressure generally at said filtrate outlet.

10. An apparatus for high-precision separation of pharmaceutical or biotechnology liquids while maintaining a substantially constant trans-membrane pressure across a separation unit of the apparatus, comprising:

a reservoir for containing a pharmaceutical or biotechnology liquid, the liquid containing filterable material dissolved or suspended within a carrier liquid;

a separation unit having an inlet, a filtrate outlet and a retentate outlet, said separation unit receives the liquid to be filtered through the inlet and separates at least some of the filterable material therefrom which passes as filtrate through said filtrate outlet, and a retentate of the carrier liquid and residue filterable material passes from the retentate outlet;

a processor-controlled pump unit which controls movement rate of the liquid through the filtration unit;

a conduit system which, by operation of said processor-controlled pump, directs the liquid to be filtered from said reservoir to said inlet of the separation unit and from the retentate outlet for return passage to said reservoir;

at least one detector positioned along a location of said apparatus downstream of the separation unit for monitoring a parameter of the liquid within said apparatus and for transmitting data on the parameter to the processor-controlled pump;

at least one valve downstream of the separation unit for modifying pressure within said apparatus;

said processor-controlled pump unit includes control logic which receives said data from said detector, calculates the trans-membrane pressure across the filtration unit from said data, compares the thus calculated trans-membrane pressure with a selected trans-membrane pressure for the pharmaceutical or biotechnology liquid undergoing high-precision separation, and if a deviation between the calculated and selected trans-membrane pressure occurs, signals said valve to operate to vary the pressure at said detector so that the calculated trans membrane pressure is made to substantially coincide with the selected trans-membrane pressure; and said control logic includes a capture and hold component which selects a peak pressure value at said pressure sensor, which peak pressure value is used in determining the calculated trans-membrane pressure.

11. An apparatus for high-precision separation of pharmaceutical or biotechnology liquids while maintaining a substantially constant trans-membrane pressure across a separation unit of the apparatus, comprising:

a reservoir for containing a pharmaceutical or biotechnology liquid, the liquid containing filterable material dissolved or suspended within a carrier liquid;

a separation unit having an inlet, a filtrate outlet and a retentate outlet, said separation unit receives the liquid to be filtered through the inlet and separates at least some of the filterable material therefrom which passes as filtrate through said filtrate outlet, and a retentate of the carrier liquid and residue filterable material passes from the retentate outlet;

a processor-controlled pump unit which controls movement rate of the liquid through the filtration unit;

a conduit system which, by operation of said processor-controlled pump, directs the liquid to be filtered from said reservoir to said inlet of the separation unit and from the retentate outlet for return passage to said reservoir;

at least one detector positioned along a location of said apparatus downstream of the separation unit for monitoring a parameter of the liquid within said apparatus and for transmitting data on the parameter to the processor-controlled pump;

at least one valve downstream of the separation unit for modifying pressure within said apparatus;

said processor-controlled pump unit includes control logic which receives said data from said detector, calculates the trans-membrane pressure across the filtration unit from said data, compares the thus calculated trans-membrane pressure with a selected trans-membrane pressure for the pharmaceutical or biotechnology liquid undergoing high-precision separation, and if a deviation between the calculated and selected trans-membrane pressure occurs, signals said valve to operate to vary the pressure at said detector so that the calculated trans-membrane pressure is made to substantially coincide with the selected trans-membrane pressure; and a unit which detects the amount of filtrate which passes through the filtrate outlet, and said control logic receives filtrate amount data from said unit, whereby a pressure value or a feed rate value is varied and the filtrate collection amount is monitored to detect an optimum pressure value or feed rate achieving a maximum collection rate, and said optimum pressure value or feed rate determines said selected trans-membrane pressure for the apparatus.

12. An apparatus for high-precision separation of pharmaceutical or biotechnology liquids while maintaining a substantially constant trans-membrane pressure across a separation unit of the apparatus, comprising:

a reservoir for containing a pharmaceutical or biotechnology liquid, the liquid containing filterable material dissolved or suspended within a carrier liquid;

a separation unit having an inlet, a filtrate outlet and a retentate outlet, said separation unit receives the liquid to be filtered through the inlet and separates at least some of the filterable material therefrom which passes as filtrate through said filtrate outlet, and a retentate of the carrier liquid and residue filterable material passes from the retentate outlet;

a processor-controlled pump unit which controls movement rate of the liquid through the filtration unit;

a conduit system which, by operation of said processor-controlled pump, directs the liquid to be filtered from said reservoir to said inlet of the separation unit and from the retentate outlet for return passage to said reservoir;

at least one detector positioned along a location of said apparatus downstream of the separation unit for monitoring a parameter of the liquid within said apparatus and for transmitting data on the parameter to the processor-controlled pump;

at least one valve downstream of the separation unit for modifying pressure within said apparatus;

said processor-controlled pump unit includes control logic which receives said data from said detector, calculates the trans-membrane pressure across the filtration unit from said data, compares the thus calculated trans-membrane pressure with a selected trans membrane pressure for the pharmaceutical or biotechnology liquid undergoing high-precision separation, and if a deviation between the calculated and selected trans membrane pressure occurs, signals said valve to operate to vary the pressure at said detector so that the calculated trans-membrane pressure is made to substantially coincide with the selected trans-membrane pressure; and said control logic includes a stopping component which directs ceasing of movement of the liquid by the processor-controlled pump unit.

13. An apparatus for high-precision separation of pharmaceutical or biotechnology liquids while maintaining a substantially constant trans-membrane pressure across a separation unit of the apparatus, comprising:

a reservoir for containing a pharmaceutical or biotechnology liquid, the liquid containing filterable material dissolved or suspended within a carrier liquid;

a separation unit having an inlet, a filtrate outlet and a retentate outlet, said separation unit receives the liquid to be filtered through the inlet and separates at least some of the filterable material therefrom which passes as filtrate through said filtrate outlet, and a retentate of the carrier liquid and residue filterable material passes from the retentate outlet;

a processor-controlled pump unit which controls movement rate of the liquid through the filtration unit;

a conduit system which, by operation of said processor-controlled pump, directs the liquid to be filtered from said reservoir to said inlet of the separation unit and from the retentate outlet for return passage to said reservoir;

at least one detector positioned along a location of said apparatus downstream of the separation unit for monitoring a parameter of the liquid within said apparatus and for transmitting data on the parameter to the processor-controlled pump;

at least one valve downstream of the separation unit for modifying pressure within said apparatus;

said processor-controlled pump unit includes control logic which receives said data from said detector, calculates the trans-membrane pressure across the filtration unit from said data, compares the thus calculated trans-membrane pressure with a selected trans-membrane pressure for the pharmaceutical or biotechnology liquid undergoing high-precision separation, and if a deviation between the calculated and selected trans-membrane pressure occurs, signals said valve to operate to vary the pressure at said detector so that the calculated trans-membrane pressure is made to substantially coincide with the selected trans-membrane pressure; and said conduit system includes tubing of a selected size, wherein said control logic includes a limit setting component which receives a user-input indication of said selected size of the tubing, and wherein said control logic includes a calibration look-up table which relates a pump unit speed of rotation parameter with a pump unit output in terms of volume per unit time.

14. An apparatus for high-precision separation of pharmaceutical or biotechnology liquids while maintaining a substantially constant trans-membrane pressure across a separation unit of the apparatus, comprising:

a reservoir for containing a pharmaceutical or biotechnology liquid, the liquid containing filterable material dissolved or suspended within a carrier liquid;

a separation unit having an inlet, a filtrate outlet and a retentate outlet, said separation unit receives the liquid to be filtered through the inlet and separates at least some of the filterable material therefrom which passes as filtrate through said filtrate outlet, and a retentate of the carrier liquid and residue filterable material passes from the retentate outlet;

a processor-controlled pump unit which controls movement rate of the liquid through the filtration unit;

a conduit system which, by operation of said processor-controlled pump, directs the liquid to be filtered from said reservoir to said inlet of the separation unit and from the retentate outlet for return passage to said reservoir;

at least one detector positioned along a location of said apparatus downstream of the separation unit for monitoring a parameter of the liquid within said apparatus and for transmitting data on the parameter to the processor-controlled pump;

at least one valve downstream of the separation unit for modifying pressure within said apparatus;

said processor-controlled pump unit includes control logic which receives said data from said detector, calculates the trans-membrane pressure across the filtration unit from said data, compares the thus calculated trans-membrane pressure with a selected trans-membrane pressure for the pharmaceutical or biotechnology liquid undergoing high-precision separation, and if a deviation between the calculated and selected trans-membrane pressure occurs, signals said valve to operate to vary the pressure at said detector so that the calculated trans-membrane pressure is made to substantially coincide with the selected trans-membrane pressure; and a dip-type transducer immersed into said reservoir for monitoring concentration changes in the liquid.

15. An apparatus for high-precision separation of pharmaceutical or biotechnology liquids while maintaining a substantially constant feed rate, comprising:

a supply of pharmaceutical or biotechnology liquid, the liquid containing filterable material dissolved or suspended within a carrier liquid;

a separation unit having an inlet, a filtrate outlet and a retentate outlet, said separation unit receives the liquid to be filtered through the inlet and separates at least some of the filterable material therefrom which passes as filtrate through said filtrate outlet and to a permeate collector, and a retentate of the carrier liquid and residue filterable material passes from the retentate outlet to a retentate collector;

a processor-controlled pump which controls movement rate of the liquid through the separation unit;

a conduit system which directs the liquid to be filtered from said supply of liquid to said inlet of the separation unit and from the retentate outlet for return passage to said supply of liquid;

a permeate scale for monitoring the quantity of liquid within the permeate collector and for transmitting permeate quantity data to the processor-controlled pump;

a retentate scale for monitoring the quantity of liquid within the retentate collector and for transmitting retentate quantity data to the processor-controlled pump; and said processor-controlled pump having control logic which receives said permeate quantity data and said retentate quantity data to control flow of the liquid through said separation unit, said control logic directing the pump to modify the retentate quantity, the permeate quantity or both to substantially coincide with a selected retentate quantity, permeate quantity or both.

16. The apparatus in accordance with claim 15, further including an auxiliary pump which adjusts liquid flow into the permeate collector or retentate collector so as to maintain a substantially constant quantity thereof.

17. The apparatus in accordance with claim 15, wherein said auxiliary pump adds liquid to the supply of liquid at a quantity determined in accordance with said permeate quantity data.

18. The apparatus in accordance with claim 17, wherein said auxiliary pump adds liquid to the supply of liquid at substantially the same rate as permeate collection rate determined in accordance with said permeate quantity data.

19. The apparatus in accordance with claim 18, further including a unit which signals an alarm in the event said auxiliary pump fails to maintain a constant retentate quantity.

20. The apparatus in accordance with claim 19, wherein said unit which signals an alarm includes a stopping component which directs ceasing of movement of the liquid by the processor-controlled pump.

21. The apparatus in accordance with claim 15, further including a remote control system for controlling said processor-controlled pump.

22. The apparatus in accordance with claim 15, wherein said conduit system includes tubing of a selected size, wherein said control logic includes a limit setting component which receives a user-input indication of said selected size of the tubing, and wherein said control logic includes a calibration look-up table which relates a pump speed of rotation parameter with a pump output in terms of volume per unit time.

23. The apparatus in accordance with claim 15, further including a flow-through detector along said conduit system for monitoring and controlling addition of solutions into the conduit system or into the supply of liquid, permeate collector or retentate collector and for monitoring and controlling removal of liquids.

24. The apparatus in accordance with claim 15, further including a dip-type transducer immersed into said supply of liquid, permeate collector or retentate collector for monitoring concentration changes in the liquid.

25. An apparatus for high-precision separation of pharmaceutical or biotechnology liquids while maintaining a substantially constant feed rate, comprising:

a reservoir for containing a pharmaceutical or biotechnology liquid, the liquid containing filterable material dissolved or suspended within a carrier liquid;

a separation unit having an inlet, a filtrate outlet and a retentate outlet, said separation unit receives the liquid to be filtered through the inlet and separates at least some of the filterable material therefrom which passes as filtrate through said filtrate outlet and to a permeate collector, and a retentate of the carrier liquid and residue filterable material passes from the retentate outlet as a collected retentate;

a conduit system which directs the liquid to be filtered from said reservoir to said inlet of the separation unit and from the retentate outlet for return passage to said reservoir;

a processor-controlled pump unit which controls movement rate of the liquid through the separation unit, said processor-controlled pump unit having control logic which directs the pump unit to modify its pumping rate in response to changes in liquid flow so as to maintain a selected flow rate imparted to the liquid by the pump unit; and a liquid level sensor for said collected retentate, said sensor signals liquid from said reservoir to be added into said collected retentate before the quantity of liquid therein drops below a selected amount so as to facilitate maintaining the substantially constant feed rate.

26. The apparatus in accordance with claim 25, further including a unit which signals an alarm in the event the liquid drops below said selected amount.

27. The apparatus in accordance with claim 26, wherein said un-it which signals an alarm includes a stopping component which directs ceasing of movement of the liquid by the processor-controlled pump unit when the collected retentate quantity of liquid drops below the selected amount.

28. The apparatus in accordance with claim 25, further including an auxiliary pump in data-passing communication with said liquid level sensor, and said auxiliary pump moves liquid from said reservoir to said collected retentate for maintaining said quantity of liquid.

29. The apparatus in accordance with claim 25, further including an auxiliary pump in data-passing communication with said liquid level sensor, and said auxiliary pump moves liquid from said reservoir to said collected retentate for maintaining said quantity of liquid.

30. The apparatus in accordance with claim 25, further including a flow-through detector along said conduit system for monitoring and controlling addition of solutions into the conduit system or into the reservoir and for monitoring and controlling removal of liquids.

31. The apparatus in accordance with claim 25, further including a dip-type tranducer immersed into said reservoir for monitoring concentration changes in the liquid.

32. A method for high-precision filtering of pharmaceutical or biotechnology liquids while maintaining a substantially constant trans-membrane pressure which substantially coincides with a selected trans-membrane pressure across a membrane filtration unit, comprising:

providing within a reservoir a pharmaceutical or biotechnology liquid having a pharmaceutical or biotechnology filterable material dissolved or suspended within a carrier liquid;

providing a membrane filtration unit having an inlet, a filtrate outlet and a retentate outlet;

passing liquid to be filtered through the inlet of the filtration unit and separating at least some of the filterable material therefrom as filtrate from the filtrate outlet;

passing a retentate of the carrier liquid and residue filterable material from the retentate outlet;

directing the liquid from the retentate outlet and to the reservoir;

detecting and monitoring a parameter of the retentate by use of a detector;

providing at least one pressure sensor and valve positioned along a location for monitoring and modifying pressure;

controlling movement rate of the liquid through the filtration unit, including calculating the trans-membrane pressure across the filtration unit using the detected parameter data, comparing the thus calculated trans-membrane pressure with a selected trans-membrane pressure, and if a deviation between the calculated and selected trans-membrane pressure occurs, varying the liquid flow at the detector so that the calculated trans-membrane pressure substantially coincides with the selected trans-membrane pressure across the membrane filtration unit.

33. A method for high-precision filtering of pharmaceutical or biotechnology liquids while maintaining a substantially constant feed rate, comprising:

providing a supply of pharmaceutical or biotechnology liquid containing filterable material dissolved or suspended within a carrier liquid;

providing a membrane filtration unit having an inlet, a filtrate outlet and a retentate outlet;

passing the liquid to be filtered through the inlet by operation of a pump unit;

separating at least some of the filterable material as filtrate and passing same through the filtrate outlet and into a permeate collector;

monitoring the quantity of permeate within the permeate collector;

passing the retentate of the carrier liquid and residue filterable material from the retentate outlet to provide collected retentate;

monitoring the quality of retentate of the collected retentate; and controlling movement rate of the liquid through the filtration unit, including receiving data from the monitoring of permeate and of retentate and directing the pump unit to modify the retentate quantity, the permeate quantity or both in order to substantially coincide with a selected retentate quantity, permeate quantity, or both.

34. The method of claim 33, wherein said monitoring comprises detecting the weight of the permeate and of the retentate.

35. A method for high-precision filtering of pharmaceutical or biotechnology liquids while maintaining a substantially constant feed rate, comprising:

providing a supply of pharmaceutical or biotechnology liquid containing filterable material dissolved or suspended within a carrier liquid;

providing a membrane filtration unit having an inlet, a filtrate outlet and a retentate outlet;

passing the liquid to be filtered through the inlet by operation of a pump unit;

separating at least some of the filterable material as filtrate and passing same through the filtrate outlet;

passing the retentate of the carrier liquid and residue filterable material from the retentate outlet and to a retentate collector;

sensing the liquid level within the retentate collector; and controlling movement of the liquid into the retentate collector before the quantity of liquid therein drops below a selected amount so as to facilitate maintaining the substantially constant feed rate.

* * * * *

UNITED STATES PATENT AND TRADEMARK OFFICE
CERTIFICATE OF CORRECTION

PATENT NO. : 6,607,669 B2
DATED : August 19, 2003
INVENTOR(S) : Karl G. Schick

It is certified that error appears in the above-identified patent and that said Letters Patent is hereby corrected as shown below:

Column 2,
Line 49, after "present" insert -- invention --.

Column 8,
Line 2, delete "an" insert -- a --.

Column 12,
Line 61, delete "as" insert -- is --.

Column 23,
Line 10, delete "an auxiliary pump in data-passing communication" insert -- a level sensor controller associated --.
Line 11, delete "auxiliary pump" insert -- level sensor controller --.

Column 24,
Line 22, delete "quality" insert -- quantity --.

Signed and Sealed this

Thirteenth Day of July, 2004

JON W. DUDAS
*Acting Director of the United States Patent and Trademark Office*